United States Patent
Weinzaepfel

(10) Patent No.: US 11,182,620 B2
(45) Date of Patent: Nov. 23, 2021

(54) METHOD FOR TRAINING A CONVOLUTIONAL RECURRENT NEURAL NETWORK AND FOR SEMANTIC SEGMENTATION OF INPUTTED VIDEO USING THE TRAINED CONVOLUTIONAL RECURRENT NEURAL NETWORK

(71) Applicant: Naver Corporation, Seongnam-si (KR)

(72) Inventor: Philippe Weinzaepfel, Montbonnot-Saint-Martin (FR)

(73) Assignee: Naver Corporation

( * ) Notice: Subject to any disclaimer, the term of this patent is extended or adjusted under 35 U.S.C. 154(b) by 0 days.

(21) Appl. No.: 16/517,942

(22) Filed: Jul. 22, 2019

(65) Prior Publication Data

US 2020/0160065 A1  May 21, 2020

(30) Foreign Application Priority Data

Aug. 10, 2018  (EP) .................................... 18306104

(51) Int. Cl.
  *G06F 17/15* (2006.01)
  *G06N 3/04* (2006.01)
  *G06N 3/08* (2006.01)
  *G06K 9/00* (2006.01)

(52) U.S. Cl.
  CPC ......... *G06K 9/00765* (2013.01); *G06F 17/15* (2013.01); *G06N 3/0454* (2013.01); *G06N 3/08* (2013.01)

(58) Field of Classification Search
  CPC combination set(s) only.
  See application file for complete search history.

(56) References Cited

U.S. PATENT DOCUMENTS

| 2017/0206405 A1* | 7/2017 | Molchanov | ........ G06K 9/00355 |
| 2017/0255832 A1* | 9/2017 | Jones | .................... G06N 3/0454 |
| 2019/0311202 A1* | 10/2019 | Lee | ....................... G06K 9/6256 |

OTHER PUBLICATIONS

Pankaj Malhotra,TimeNet: Pre-trained deep recurrent neural network for time series classification , Proceedings of 25th European Symposium on Artificial Neural Networks, Computational Intelligence and Machine Learning, Jun. 23, 2017, pp. 1-5.*

(Continued)

*Primary Examiner* — Omar S Ismail

(57) ABSTRACT

A method for training a convolutional recurrent neural network for semantic segmentation in videos, includes (a) training, using a set of semantically segmented training images, a first convolutional neural network; (b) training, using a set of semantically segmented training videos, a convolutional recurrent neural network, corresponding to the first convolutional neural network, wherein a convolutional layer has been replaced by a recurrent module having a hidden state. The training of the convolutional recurrent neural network, for each pair of successive frames (t−1, t∈ $[\![1; T]\!]^2$) of a video of the set of semantically segmented training videos includes warping an internal state of a recurrent layer according to an estimated optical flow between the frames of the pair of successive frames, so as to adapt the internal state to the motion of pixels between the frames of the pair and learning parameters of at least the recurrent module.

21 Claims, 7 Drawing Sheets

(56) References Cited

OTHER PUBLICATIONS

Liang-Chieh Chen,Rethinking Atrous Convolution for Semantic Image Segmentation,Computer Vision and Pattern Recognition,https://arxiv.org/abs/1706.05587, May 12, 2017, pp. 1-6.*

Siam, M., S. Valipour, M. Jagersand, and N. Ray. 'Convolutional Gated Recurrent Networks for Video Segmentation'. In 2017 IEEE International Conference on Image Processing (ICIP), 3090-94, 2017. https://doi.org/10.1109/ICIP.2017.8296851. 2017.

Szegedy, Christian, Wei Liu, Yangqing Jia, Pierre Sermanet, Scott Reed, Dragomir Anguelov, Dumitru Erhan, Vincent Vanhoucke, and Andrew Rabinovich. 'Going Deeper with Convolutions'. In 2015 IEEE Conference on Computer Vision and Pattern Recognition (CVPR), 1-9. Boston, MA, USA: IEEE, 2015. https://doi.org/10.1109/CVPR.2015.7298594. 2015.

Tokmakov, P., K. Alahari, and C. Schmid. 'Learning Video Object Segmentation with Visual Memory'. In 2017 IEEE International Conference on Computer Vision (ICCV), 4491-4500, 2017. https://doi.org/10.1109/ICCV.2017.480. 2017.

Tripathi, Subarna, Serge Belongie, Youngbae Hwang, and Truong Nguyen. 'Semantic Video Segmentation: Exploring Inference Efficiency'. In 2015 International SoC Design Conference (ISOCC), 157-58. Gyungju, South Korea: IEEE, 2015. https://doi.org/10.1109/ISOCC.2015.7401766. 2015.

Valipour, S., M. Siam, M. Jagersand, and N. Ray. 'Recurrent Fully Convolutional Networks for Video Segmentation'. In 2017 IEEE Winter Conference on Applications of Computer Vision (WACV), 29-36, 2017. https://doi.org/10.1109/WACV.2017.11. 2017.

Werbos, P. J. 'Backpropagation through Time: What It Does and How to Do It'. Proceedings of the IEEE 78, No. 10 (Oct. 1990): 1550-60. https://doi.org/10.1109/5.58337. 1990.

Wojna, Zbigniew, Jasper R. R. Uijlings, Sergio Guadarrama, Nathan Silberman, Liang-Chieh Chen, Alireza Fathi, and Vittorio Ferrari. 'The Devil Is in the Decoder'. ArXiv abs/1707.05847 (2017). 2017.

Xiao, Fanyi, and Yong Jae Lee. 'Video Object Detection with an Aligned Spatial-Temporal Memory'. ArXiv:1712.06317 [Cs], Dec. 18, 2017. http://arxiv.org/abs/1712.06317. 2017.

Yong Du, Wei Wang, and Liang Wang. 'Hierarchical Recurrent Neural Network for Skeleton Based Action Recognition'. In 2015 IEEE Conference on Computer Vision and Pattern Recognition (CVPR), 1110-18. Boston, MA, USA: IEEE, 2015. https://doi.org/10.1109/CVPR.2015.7298714. 2015.

Yu, Fisher, and Vladlen Koltun. 'Multi-Scale Context Aggregation by Dilated Convolutions', 2016, 13. 2016.

Zhao, Hengshuang, Jianping Shi, Xiaojuan Qi, Xiaogang Wang, and Jiaya Jia. 'Pyramid Scene Parsing Network', 2016, 10. 2016.

Zheng, Shuai, Sadeep Jayasumana, Bernardino Romera-Paredes, Vibhav Vineet, Zhizhong Su, Dalong Du, Chang Huang, and Philip H. S. Torr. 'Conditional Random Fields as Recurrent Neural Networks'. In 2015 IEEE International Conference on Computer Vision (ICCV), 1529-37. Santiago, Chile: IEEE, 2015. https://doi.org/10.1109/ICCV.2015.179. 2015.

Zhou, B., H. Zhao, X. Puig, S. Fidler, A. Barriuso, and A. Torralba. 'Scene Parsing through ADE20K Dataset'. In 2017 IEEE Conference on Computer Vision and Pattern Recognition (CVPR), 5122-30, 2017. https://doi.org/10.1109/CVPR.2017.544. 2017.

Zhu, Xizhou, Yujie Wang, Jifeng Dai, Lu Yuan, and Yichen Wei. 'Flow-Guided Feature Aggregation for Video Object Detection'. In 2017 IEEE International Conference on Computer Vision (ICCV), 408-17. Venice: IEEE, 2017. https://doi.org/10.1109/ICCV.2017.52. 2017.

Bailer, Christian, Bertram Taetz, and Didier Stricker. 'Flow Fields: Dense Correspondence Fields for Highly Accurate Large Displacement Optical Flow Estimation'. In 2015 IEEE International Conference on Computer Vision (ICCV), 4015-23. Santiago, Chile: IEEE, 2015. https://doi.org/10.1109/ICCV.2015.457. 2015.

Ballas, Nicolas, Li Yao, Chris Pal, and Aaron Courville. 'Delving Deeper into Convolutional Networks for Learning Video Representations'. ArXiv:1511.06432 [Cs], Nov. 19, 2015. http://arxiv.org/abs/1511.06432. 2015.

Bottou, Leon. 'Large-Scale Machine Learning with Stochastic Gradient Descent', 2010, 10. 2010.

Brostow, Gabriel J., Julien Fauqueur, and Roberto Cipolla. 'Semantic Object Classes in Video: A High-Definition Ground Truth Database'. Pattern Recognition Letters 30, No. 2 (Jan. 2009): 88-97. https://doi.org/10.1016/j.patrec.2008.04.005. 2008.

Chen, Albert Y. C., and Jason J. Corso. 'Temporally Consistent Multi-Class Video-Object Segmentation with the Video Graph-Shifts Algorithm'. In 2011 IEEE Workshop on Applications of Computer Vision (WACV), 614-21. Kona, HI, USA: IEEE, 2011. https://doi.org/10.1109/WACV.2011.5711561. 2011.

Chen, L., G. Papandreou, I. Kokkinos, K. Murphy, and A. L. Yuille. 'DeepLab: Semantic Image Segmentation with Deep Convolutional Nets, Atrous Convolution, and Fully Connected CRFs'. IEEE Transactions on Pattern Analysis and Machine Intelligence 40, No. 4 (Apr. 2018): 834-48. https://doi.org/10.1109/TPAMI.2017.2699184. 2018.

Chen, Liang-Chieh, George Papandreou, Florian Schroff, and Hartwig Adam. 'Rethinking Atrous Convolution for Semantic Image Segmentation'. ArXiv:1706.05587 [Cs], Jun. 17, 2017. http://arxiv.org/abs/1706.05587. 2017.

Cho, Kyunghyun, Bart van Merriënboer, Caglar Gulcehre, Dzmitry Bandanau, Fethi Bougares, Holger Schwenk, and Yoshua Bengio. 'Learning Phrase Representations Using RNN Encoder—Decoder for Statistical Machine Translation'. In Proceedings of the 2014 Conference on Empirical Methods in Natural Language Processing (EMNLP), 1724-1734. Doha, Qatar: Association for Computational Linguistics, 2014. https://doi.org/10.3115/v1/D14-1179. 2014.

Cordts, M., M. Omran, S. Ramos, T. Rehfeld, M. Enzweiler, R. Benenson, U. Franke, S. Roth, and B. Schiele. 'The Cityscapes Dataset for Semantic Urban Scene Understanding'. In 2016 IEEE Conference on Computer Vision and Pattern Recognition (CVPR), 3213-23, 2016. https://doi.org/10.1109/CVPR.2016.350. 2016.

Dai, Jifeng, Kaiming He, and Jian Sun. 'BoxSup: Exploiting Bounding Boxes to Supervise Convolutional Networks for Semantic Segmentation'. In 2015 IEEE International Conference on Computer Vision (ICCV), 1635-43. Santiago, Chile: IEEE, 2015. https://doi.org/10.1109/ICCV.2015.191. 2015.

Donahue, Jeffrey, Lisa Anne Hendricks, Sergio Guadarrama, Marcus Rohrbach, Subhashini Venugopalan, Kate Saenko, and Trevor Darrell. 'Long-Term Recurrent Convolutional Networks for Visual Recognition and Description', 10, 2015. 2015.

Dosovitskiy, Alexey, Philipp Fischer, Eddy Ilg, Philip Hausser, Caner Hazirbas, Vladimir Golkov, Patrick van der Smagt, Daniel Cremers, and Thomas Brox. 'FlowNet: Learning Optical Flow with Convolutional Networks'. In 2015 IEEE International Conference on Computer Vision (ICCV), 2758-66. Santiago: IEEE, 2015. https://doi.org/10.1109/ICCV.2015.316. 2015.

Everingham, Mark, S. M. Ali Eslami, Luc Van Gool, Christopher K. I. Williams, John Winn, and Andrew Zisserman. 'The Pascal Visual Object Classes Challenge: A Retrospective'. International Journal of Computer Vision 111, No. 1 (Jan. 2015): 98-136. https://doi.org/10.1007/s11263-014-0733-5. 2015.

Finn, Chelsea, Ian Goodfellow, and Sergey Levine. 'Unsupervised Learning for Physical Interaction through Video Prediction'. In Advances in Neural Information Processing Systems 29, edited by D. D. Lee, M. Sugiyama, U. V. Luxburg, I. Guyon, and R. Garnett, 64-72. Curran Associates, Inc., 2016. http://papers.nips.cc/paper/6161-unsupervised-learning-for-physical-interaction-through-video-prediction.pdf. 2016.

Gadde, R., V. Jampani, and P. V. Gehler. 'Semantic Video CNNs Through Representation Warping'. In 2017 IEEE International Conference on Computer Vision (ICCV), 4463-72, 2017. https://doi.org/10.1109/ICCV.2017.477. 2017.

Gaidon, Adrien, Qiao Wang, Yohann Cabon, and Eleonora Vig. 'VirtualWorlds as Proxy for Multi-Object Tracking Analysis'. In 2016 IEEE Conference on Computer Vision and Pattern Recognition (CVPR), 4340-49. Las Vegas, NV, USA: IEEE, 2016. https://doi.org/10.1109/CVPR.2016.470. 2016.

Graves, Alex, Abdel-rahman Mohamed, and Geoffrey Hinton. 'Speech Recognition with Deep Recurrent Neural Networks'. In 2013 IEEE International Conference on Acoustics, Speech and Signal Process-

(56) References Cited

OTHER PUBLICATIONS ing, 6645-49. Vancouver, BC, Canada: IEEE, 2013. https://doi.org/10.1109/ICASSP.2013.6638947. 2013.

He, Kaiming, Xiangyu Zhang, Shaoqing Ren, and Jian Sun. 'Deep Residual Learning for Image Recognition'. In 2016 IEEE Conference on Computer Vision and Pattern Recognition (CVPR), 770-78. Las Vegas, NV, USA: IEEE, 2016. https://doi.org/10.1109/CVPR.2016.90. 2016.

Hinton, Geoffrey E. Rectified Linear Units Improve Restricted Boltzmann Machines Vinod Nair, 2010. 2010.

Hochreiter, Sepp. 'The Vanishing Gradient Problem During Learning Recurrent Neural Nets and Problem Solutions'. International Journal of Uncertainty, Fuzziness and Knowledge-Based Systems 06, No. 02 (Apr. 1998): 107-16. https://doi.org/10.1142/S0218488598000094. 1998.

Hochreiter, Sepp, and Jürgen Schmidhuber. 'Long Short-Term Memory'. Neural Computation 9, No. 8 (Nov. 1, 1997): 1735-80. https://doi.org/10.1162/neco.1997.9.8.1735. 1997.

Hopfield, J. J. 'Neural Networks and Physical Systems with Emergent Collective Computational Abilities'. Proceedings of the National Academy of Sciences 79, No. 8 (Apr. 1, 1982): 2554-58. https://doi.org/10.1073/pnas.79.8.2554. 1982.

Sundaram, Narayanan, Thomas Brox, Kurt Keutzer et al. 'Dense Point Trajectories by GPU-Accelerated Large Displacement Optical Flow'. Electrical Engineering and Computer Sciences, University of California at Berkeley, Technical Report No. UCB/EECS-2010-104, Jul. 1, 2010 2010.

Ioffe, Sergey, and Christian Szegedy. 'Batch Normalization: Accelerating Deep Network Training by Reducing Internal Covariate Shift'. ArXiv:1502.03167 [Cs], Feb. 10, 2015. http://arxiv.org/abs/1502.03167. 2015.

Jampani, V., R. Gadde, and P. V. Gehler. 'Video Propagation Networks'. In 2017 IEEE Conference on Computer Vision and Pattern Recognition (CVPR), 3154-64, 2017. https://doi.org/10.1109/CVPR.2017.336. 2017.

Jampani, Varun, Martin Kiefel, and Peter V. Gehler. 'Learning Sparse High Dimensional Filters: Image Filtering, Dense CRFs and Bilateral Neural Networks'. In 2016 IEEE Conference on Computer Vision and Pattern Recognition (CVPR), 4452-61. Las Vegas, NV, USA: IEEE, 2016. https://doi.org/10.1109/CVPR.2016.482. 2016.

Krizhevsky, Alex, Ilya Sutskever, and Geoffrey E Hinton. 'ImageNet Classification with Deep Convolutional Neural Networks'. In Advances in Neural Information Processing Systems 25, edited by F. Pereira, C. J. C. Burges, L. Bottou, and K. Q. Weinberger, 1097-1105. Curran Associates, Inc., 2012. http://papers.nips.cc/paper/4824-imagenet-classification-with-deep-convolutional-neural-networks.pdf. 2012.

Kroeger, Till, Radu Timofte, Dengxin Dai, and Luc Van Gool. 'Fast Optical Flow Using Dense Inverse Search'. In Computer Vision—ECCV 2016, edited by Bastian Leibe, Jiri Matas, Nicu Sebe, and Max Welling, 9908:471-88. Cham: Springer International Publishing, 2016. https://doi.org/10.1007/978-3-319-46493-0_29. 2016.

Kundu, A., V. Vineet, and V. Koltun. 'Feature Space Optimization for Semantic Video Segmentation'. In 2016 IEEE Conference on Computer Vision and Pattern Recognition (CVPR), 3168-75, 2016. https://doi.org/10.1109/CVPR.2016.345. 2016.

Lin, Guosheng, Anton Milan, Chunhua Shen, and Ian Reid. 'RefineNet: Multi-Path Refinement Networks for High-Resolution Semantic Segmentation'. In 2017 IEEE Conference on Computer Vision and Pattern Recognition (CVPR), 5168-77. Honolulu, HI: IEEE, 2017. https://doi.org/10.1109/CVPR.2017.549. 2017.

Lin, Guosheng, Chunhua Shen, Anton van den Hengel, and Ian Reid. 'Efficient Piecewise Training of Deep Structured Models for Semantic Segmentation'. In 2016 IEEE Conference on Computer Vision and Pattern Recognition (CVPR), 3194-3203. Las Vegas, NV, USA: IEEE, 2016. https://doi.org/10.1109/CVPR.2016.348. 2016.

Lin, Tsung-Yi, Michael Maire, Serge Belongie, Lubomir Bourdev, Ross Girshick, James Hays, Pietro Perona, Deva Ramanan, C. Lawrence Zitnick, and Piotr Dollár. 'Microsoft COCO: Common Objects in Context'. ArXiv:1405.0312 [Cs], May 1, 2014. http://arxiv.org/abs/1405.0312. 2014.

Liu, Jun, Amir Shahroudy, Dong Xu, and Gang Wang. 'Spatio-Temporal LSTM with Trust Gates for 3D Human Action Recognition'. ArXiv:1607.07043 [Cs], Jul. 24, 2016. http://arxiv.org/abs/1607.07043. 2016.

Liu, Wei, Andrew Rabinovich, and Alexander C Berg. 'ParseNet: Looking Wider to See Better', 2015, 8. 2015.

Liu, Ziwei, Xiaoxiao Li, Ping Luo, Chen-Change Loy, and Xiaoou Tang. 'Semantic Image Segmentation via Deep Parsing Network', 9, 2015. 2015.

Long, Jonathan, Evan Shelhamer, and Trevor Darrell. 'Fully Convolutional Networks for Semantic Segmentation', 2015, 10. 2015.

Mikolov, Tomas, Martin Karafiat, Lukas Burget, Jan Cernocky, and Sanjeev Khudanpur. 'Recurrent Neural Network Based Language Model', 4, 2010. 2010.

Miksik, Ondrej, Daniel Munoz, J. Andrew Bagnell, and Martial Hebert. 'Efficient Temporal Consistency for Streaming Video Scene Analysis'. In 2013 IEEE International Conference on Robotics and Automation, 133-39. Karlsruhe, Germany: IEEE, 2013. https://doi.org/10.1109/ICRA.2013.6630567. 2013.

Nilsson, David, and Cristian Sminchisescu. 'Semantic Video Segmentation by Gated Recurrent Flow Propagation'. In 2018 IEEE/CVF Conference on Computer Vision and Pattern Recognition, 6819-28. Salt Lake City, UT: IEEE, 2018. https://doi.org/10.1109/CVPR.2018.00713. 2018.

Noh, Hyeonwoo, Seunghoon Hong, and Bohyung Han. 'Learning Deconvolution Network for Semantic Segmentation'. In 2015 IEEE International Conference on Computer Vision (ICCV), 1520-28. Santiago, Chile: IEEE, 2015. https://doi.org/10.1109/ICCV.2015.178. 2015.

Pa, Viorica. 'Spatio-Temporal Video Autoencoder With Differentiable Memory', 2016, 13. 2016.

Pascanu, Razvan, Tomas Mikolov, and Yoshua Bengio. 'On the Difficulty of Training Recurrent Neural Networks', 9, 2013. 2013.

Pfister, Tomas, James Charles, and Andrew Zisserman. 'Flowing ConvNets for Human Pose Estimation in Videos'. In 2015 IEEE International Conference on Computer Vision (ICCV), 1913-21. Santiago, Chile: IEEE, 2015. https://doi.org/10.1109/ICCV.2015.222. 2015.

Richter, Stephan R., Zeeshan Hayder, and Vladlen Koltun. 'Playing for Benchmarks'. In 2017 IEEE International Conference on Computer Vision (ICCV), 2232-41. Venice: IEEE, 2017. https://doi.org/10.1109/ICCV.2017.243. 2017.

Ronneberger, Olaf, Philipp Fischer, and Thomas Brox. 'U-Net: Convolutional Networks for Biomedical Image Segmentation'. ArXiv:1505.04597 [Cs], May 18, 2015. http://arxiv.org/abs/1505.04597. 2015.

Ros, German, Laura Sellart, Joanna Materzynska, David Vazquez, and Antonio M. Lopez. 'The SYNTHIA Dataset: A Large Collection of Synthetic Images for Semantic Segmentation of Urban Scenes'. In 2016 IEEE Conference on Computer Vision and Pattern Recognition (CVPR), 3234-43. Las Vegas, NV, USA: IEEE, 2016. 2016.

Rumelhart, David E., Geoffrey E. Hinton, and Ronald J. Williams. 'Learning Representations by Back-Propagating Errors'. Nature 323, No. 6088 (Oct. 1986): 533. https://doi.org/10.1038/323533a0. 1986.

Sermanet, Pierre, David Eigen, Xiang Zhang, Michael Mathieu, Rob Fergus, and Yann LeCun. 'OverFeat: Integrated Recognition, Localization and Detection Using Convolutional Networks'. ArXiv:1312.6229 [Cs], Dec. 21, 2013. http://arxiv.org/abs/1312.6229. 2013.

Shelhamer, Evan, Kate Rakelly, Judy Hoffman, and Trevor Darrell. 'Clockwork Convnets for Video Semantic Segmentation'. ArXiv:1608.03609 [Cs], Aug. 11, 2016. http://arxiv.org/abs/1608.03609. 2016.

Shi, Xingjian, Zhourong Chen, Hao Wang, Dit-Yan Yeung, Wai-kin Wong, and Wang-chun Woo. 'Convolutional LSTM Network: A Machine Learning Approach for Precipitation Nowcasting'. In Advances in Neural Information Processing Systems 28, edited by C. Cortes, N. D. Lawrence, D. D. Lee, M. Sugiyama, and R. Garnett, 802-810. Curran Associates, Inc., 2015. http://papers.nips.cc/paper/

(56) References Cited

OTHER PUBLICATIONS 5955-convolutional-lstm-network-a-machine-learning-approach-for-precipitation-nowcasting.pdf. 2015.
Office Action of Korean Patent Office for correpsonding Korean Patent Application and machine translation thereof. Aug. 22, 2020.
European Search Report for EP 18306104.3 (Feb. 25, 2019) dated Feb. 25, 2019.
Response to European Search Report for EP 18306104.3 (Jul. 27, 2020) dated Jul. 27, 2020.

* cited by examiner

METHOD FOR TRAINING A CONVOLUTIONAL RECURRENT NEURAL NETWORK AND FOR SEMANTIC SEGMENTATION OF INPUTTED VIDEO USING THE TRAINED CONVOLUTIONAL RECURRENT NEURAL NETWORK

PRIORITY INFORMATION

Pursuant to 35 U.S.C. § 119 (a), this application claims the benefit of earlier filing date and right of priority to European Patent Application Number EP 18306104.3, filed on Aug. 10, 2018, The entire content of European Patent Application Number EP 18306104.3, filed on Aug. 10, 2018 is hereby incorporated by reference.

BACKGROUND

Computer vision is a recent field of endeavor which aims at providing computers with high-level understanding from digital videos. It seeks to automate tasks that the human visual system can do.

One of these tasks is the so-called "semantic" segmentation. Generally speaking, segmentation is the process of partitioning an image into sets of pixels. When each of these sets corresponds to an entity whose type can be identified (a car, a person, a building, etc.), the segmentation is considered semantic. In practice, semantic segmentation consists in assigning a class label to each pixel among a predetermined set of classes.

It has a strong interest in many applications including robotics (to understand the scene and identify where the robot can navigate) and autonomous driving. In a similar spirit, semantic segmentation is useful in the context of augmented reality to understand the scene, find the extents of objects and of regions in which the virtual objects can be added.

Semantic segmentation is a challenging task in computer vision due to the large variety of classes that include stuffs (sky, grass, etc.) and well-defined objects (cars, bottles, etc.) that can be large (e.g., building) or thin (e.g., traffic light). Semantic segmentation outputs are smooth, both in space (neighborhood pixels tend to belong to the same class, except at object boundaries) and in time (a real-world point has constant label in time, which means its projections also).

It has been proposed to use convolutional neural networks to this end. A convolutional neural network is a type of neural network wherein the connection pattern between the neurons is inspired by the visual cortex of animals. Convolutional neural networks are thus especially suitable for video processing because convolutional neural networks allow efficient recognition of entities in images.

Thus, after a supervised learning stage wherein a convolutional neural network is trained by feeding it a training set of videos already segmented; i.e., provided with the labels of to each pixel in the frames of the videos; the convolutional neural network becomes able to segment on its own some inputted videos (which are not labelled, in particular "fresh" videos from live CCTV).

Most existing methods to semantic segmentation perform at the image level, i.e., an algorithm is applied in every frame of the video independently.

One conventional approach is to transform image classification convolutional neural network architecture into a fully convolutional version in order to output a dense prediction. It is noted that feature maps usually have lower resolution than the input images, due to the stride of standard computer vision convolutional neural network architectures. The first deep segmentation approaches were thus refining the output using graphical models such as conditional random fields using an upsampling strategy, i.e., encoder-decoder architecture.

More recently, dilated convolutions (also called atrous convolutions) have been introduced, which allow extraction of denser feature maps from existing classification convolutional neural network architectures.

For better accuracy, a recent trend consists in modeling the context information at multiple scales in the last layers. For instance, this is done by concatenating the output of dilated convolutions at multiple factors, as well as globally pooled image features, or by performing spatial pooling at several grid scales in PSP-Net.

Typically, this leads to a dissatisfying flickering effect: some regions of the real world undergo many changes of semantic labels between consecutive frames. This is illustrated in FIG. 2 which shows examples of per-frame estimation on three consecutive frames (FIG. 1).

It is noted that noise artifacts are observed in the predicted labels across time (boxes), with even a region that contains flickering between more than two labels (right box).

To improve the consistency across time, the semantic segmentation should be performed at the video level; i.e., on the frames together.

There have only been a few recent attempts to address semantic video segmentation. First approaches were based on a post-processing stage using graphical models such as Markov Random Fields, Perturb-and-MAP Random Fields, or conditional random fields in space and time. More recently, is has been proposed to leverage optical flow to model motion in the pairwise potentials between frames. Another method to refine semantic segmentation in videos consists in using a filtering strategy. All these approaches nevertheless do not produce consistent video segmentation outputs.

More recently, it was proposed to introduce the NetWarp module to integrate some temporal consistency into semantic segmentation convolutional neural network architectures. The idea is to combine the features of the current frame with the features from the previous frame warped according to the optical flow. In practice, features from consecutive frames are aggregated, after warping, according to the optical flow and are used to make the final prediction, but the features remain limited to a predefined and fixed number of frames.

Alternatively, a clockwork convolutional neural network architecture has been proposed for semantic video segmentation. The clockwork convolutional neural network architecture consists in reusing intermediate features from previous frames, with the aim of reducing the runtime of video segmentation however at the cost of a drop of accuracy.

There is a consequently need for an improvement in segmentation methods using neural networks which allow direct leverage of temporal information.

BRIEF DESCRIPTION OF THE DRAWINGS

The drawings are only for purposes of illustrating various embodiments and are not to be construed as limiting, wherein.

DETAILED DESCRIPTION OF THE DRAWINGS

As set forth below, two complementary aspects of semantic video segmentation are described; (a) a method for training a convolutional recurrent neural network for semantic segmentation in videos; and (b) a method for semantic segmentation of an inputted video using a convolutional recurrent neural network, advantageously trained according to the first method.

Any video is a sequence of T frames (according to its length), numbered from 1 to T. In other words, a generic frame of a video will be referred to as frame t, with $t \in [\![1; T]\!]$. Each frame is an image, i.e., a matrix of pixels of a given size, for instance 321×321 pixels.

Semantic segmentation in a video is the classification of each pixel of each frame of the video; i.e., for each frame the prediction of a label of each pixel, defining a type of an entity depicted by said pixel, among a predetermined list of labels. It is to be understood that the frame is thus partitioned into a plurality of sets of pixels with the same label, each "connected" set of pixels with the same label defining an entity, i.e., a "real word" object. For instance, all the pixels depicting one car should be labelled as pixels of the "car" type.

Figure 4:
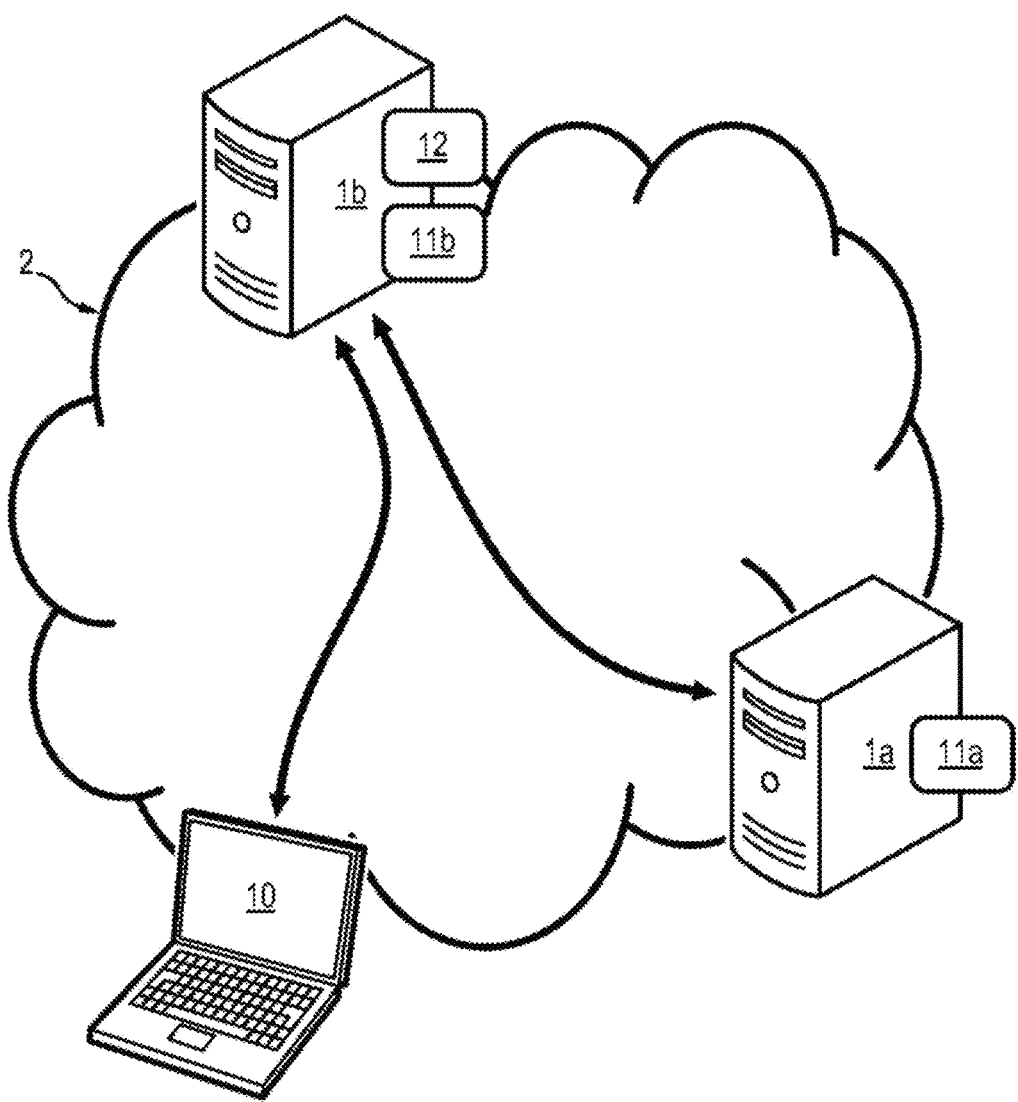
FIG. 4 illustrates an example of system for performing semantic segmentation.

The above mentioned two types of methods are implemented within a system, such as illustrated in FIG. 4, by means of a first and/or second server 1a, 1b. The first server 1a is the learning server (implementing the first method) and the second server 1b is a segmentation server (implementing the second method). It is fully possible that these two servers are merged into a single server.

Each of these servers 1a, 1b is typically remote computer equipment connected to an extended network 2 such as the Internet for data exchange. Each one comprises data processing means 11a, 11b of processor type (in particular the data processing means 11a of the first server have strong computing power, since learning is long and complex compared with ordinary use of the trained convolutional recurrent neural network), and optionally storage means 12 such as a computer memory; e.g., a hard disk.

The first server 1a stores or has access to one or more training database; i.e., a set of already classified data (as opposed to so—called inputted data that precisely is sought to be classify). As it will be explained, the data is here constituted of images and/or videos, and at least comprises training videos already semantically segmented. In other words, pixels of the training videos are already labelled.

The architecture advantageously comprises one or more items of client equipment 10, which may be any work station (also connected to network 2), preferably separate from the servers 1a, 1b but possibly being merged with one and/or the other thereof. The client equipment 10 has one or more data items to be classified. The operators of the equipment are typically "clients" in the commercial meaning of the term, of the service provider operating the first and/or second servers 1a, 1b.

Recurrent neural networks are a type of neural networks that leverage sequential information, sequences of frames in the present case. In other words, the output at a given frame will not only depend on the features from this frame, but also on the predictions from previous frames, thanks to an "internal state," also called hidden state or memory. Recurrent neural networks are very suitable for tasks, such as handwriting or speech recognition.

Recurrent neural networks have proven effective for sequence modeling in neural networks: the idea is to learn an internal state that accumulates relevant information across time and to base the prediction on the current input and this internal state. Recurrent neural networks are often hard to train due to vanishing gradient issues.

A recurrent neural network includes a "recurrent neural network module," which is a block of one of more layers presenting the "recurrent" behavior. Recurrent neural network modules are well known to the skilled person. A recurrent neural network may contain a gated recurrent unit and/or long short-term memory. The gated recurrent unit and long short-term memory contain learnable gates in order to selectively update the internal state, thus allowing for propagating the gradients throughout longer sequences while training.

Generally speaking, if defining a general setting in which $x_t$, $h_t$ and $o_t$ are respectively the input, the hidden state and the output of a recurrent neural network (RNN) module from the frame t. The output $o_t$ of the recurrent neural network module is a function of the features $x_t$ at the current frame t as well as the hidden state $h_{t-1}$ at the previous frame t−1. At the same time, the hidden state $h_t$ is updated based on the same inputs, so that a recurrent neural network module is defined by the formula:

$$o_t, h_t = RNN(x_t, h_{t-1})$$

$h_0$ is initialized ($h_0$) with a tensor of all zeros. The training stage at this zero initialization is preferably performed with sequences longer sequences than pairs.

The recurrent neural network module can be adapted to the task of semantic segmentation so as to take into account the inherent motion in videos.

Indeed, $x_t$ and $o_t$ are presently feature maps for the task of semantic segmentation, so convolutional operators (in which the input, the internal state and the output are 3D tensors) could be used inside the recurrent neural network module, for instance a convolutional gated recurrent unit.

These convolutional operators have been used for instance for video frame prediction and video captioning. Convolutional recurrent neural networks have also been applied to other dense video prediction tasks, such as video object segmentation in which the goal is to output the binary segmentation of an object across the video given its segmentation in the first frame.

For example, it has been proposed to apply a convolutional gated recurrent unit to semantic video segmentation. However, such models lack motion modeling: the prediction at a given pixel is based on the history of the prediction at this pixel, while this pixel might represent a different point in the real world in case of motion.

Indeed, the output $o_t$ shall depend on a local spatial neighborhood of $x_t$ and $h_{t-1}$, with the size of the neighborhood depending on the kernel size of the convolutional operators in a known fashion.

Standard convolutional recurrent neural networks could be contemplated, but only in cases where a given pixel $p_t$ at a frame t and the same pixel $p_{t-1}$ at the previous frame t−1 (by "same pixel", it is meant the pixel at the exact same coordinates) are projections of the same real-world point, i.e., if this point remains static in the real world (or moves along the projection ray). In other words, this would assume that the video is static, i.e., that there is no motion. However, in many applications, like autonomous driving, such an assumption is not valid and pixels may move significantly between frames.

More precisely, the prediction at the pixel $p_t$ of the frame t normally depends on the features $x_t$ in the local neighborhood $\mathcal{N}(p_t)$ of this pixel $p_t$ as well as the local neighborhood $\mathcal{N}(p_{t-1})$ from the hidden state $h_{t-1}$ at the previous frame t−1. To the contrary, the prediction at $p_t$ should actually be based on the features $x_t$ in $\mathcal{N}(p_t)$ as well as the local neighborhood $\mathcal{N}(p'_{t-1})$ from the hidden state $h_{t-1}$, where $p'_{t-1}$ is the pixel corresponding to the same point as $p_t$ in the real world.

Figure 5:
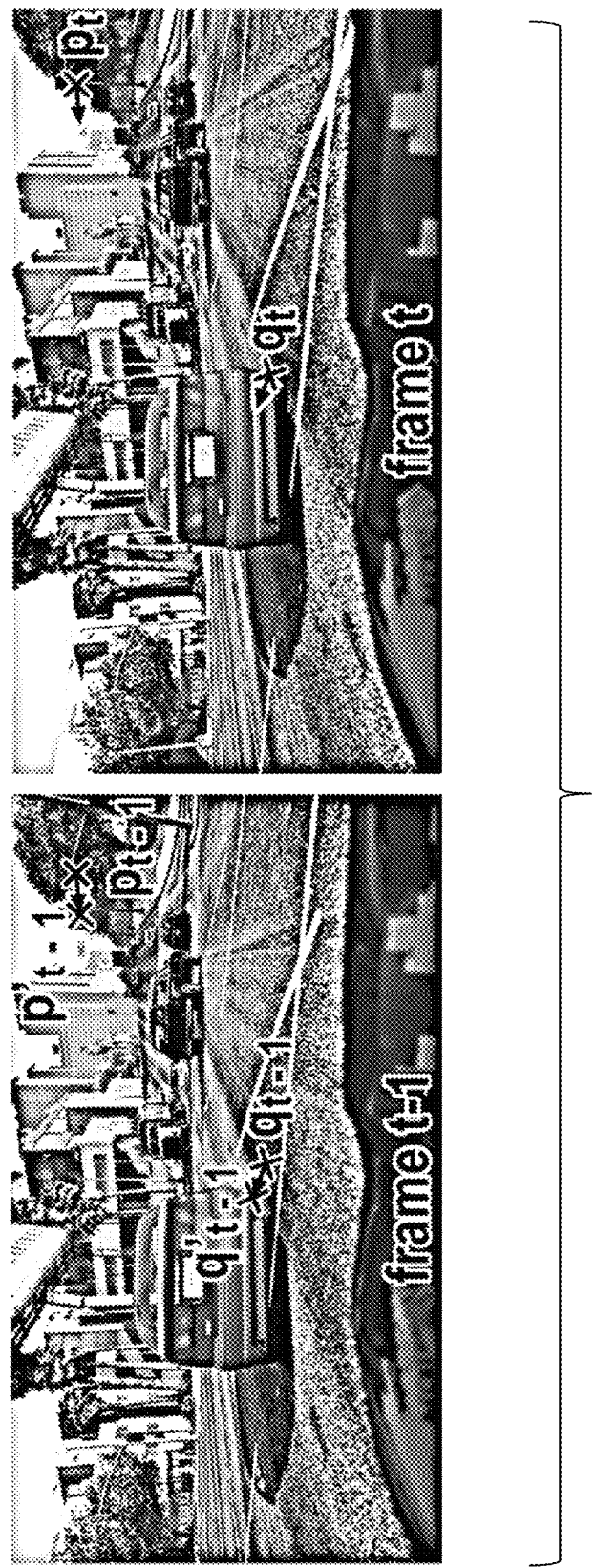
FIG. 5 illustrates how the optical flow displaces pixels over an example of two consecutive frames.

FIG. 5, which represents two examples of successive frames t−1 (left) and t (right), shows the pixels $p_{t-1}$ and $q_{t-1}$ on the previous frame t−1 at the exact same coordinates of two pixels $p_t$ and $q_t$ on the frame t. $p_{t-1}$ and $q_{t-1}$ do not belong to the same region as $p_t$ and $q_t$ respectively, in contrast to the pixels $p'_{t-1}$ and $q'_{t-1}$.

The so-called "optical flow" is a vector field defining the displacement of all pixels from an image to another one (in particular a pair of successive frames t−1, t∈⟦1; T⟧², i.e., a previous frame t−1 and a current frame t).

For instance, the optical flow $F_{t-1 \to t}$ defines the displacement of all pixels from the previous frame t−1 to the current frame t, and the optical flow $F_{t \to t-1}$ ("backward flow") defines the displacement of all pixels from the current frame t to the previous frame t−1.

The pixel $p'_{t-1}$ is given by the formula $p'_{t-1}=p_t+F_{t \to t-1}(p_t)$: in other words, the optical flow "shifts" each pixel according to the vector field.

In order to adapt the feature maps to the motion of all pixels according to the flow, the use of a recurrent module is combined with the use of a "warping" function. Indeed, if $a_{t-1}$ is a feature map at previous frame t−1 and $a_t$ the corresponding feature map at current frame t (feature map being vector fields; i.e., associating a vector to each pixel), any pixel features of $a_t(p_t)$ and $a_{t-1}(p'_{t-1})=a_{t-1}(p_t+F_{t \to t-1}(p_t))$ is combined. Since this operation would be hard to implement efficiently (because the pixels involved have different coordinates), the so-called warping of the features is first computed; i.e., to build the vector field $\vec{a}_{t-1}$ defined as $\vec{a}_{t-1}(p_t)=a_{t-1}(p_t+F_{t \to t-1}(p_t))$. Thus, features of $a_t(p_t)$ and $\vec{a}_{t-1}(p_t)$ can be directly combined pixel by pixel.

To rephrase, knowing the optical flow ($F_{t \to t-1}$), the warping is the computing from any given feature map $a_{t-1}$, of a warped feature map corresponding to the given feature map $a_{t-1}$, wherein each pixel has undergone a displacement according to the optical flow.

It is to be understood that the warping does not modify the values of the feature map (i.e., the vectors) but just "spatially re-arranges" them: in the present case of a warping from the previous frame t−1 to the current frame t, the warping function associates to each pixel $p_t$ of the current image t the value of the feature map to be warped (the internal state $h_{t-1}$ associated to the previous image t−1) for another pixel $p'_{t-1}$ according to the backward optical flow $F_{t \to t-1}$.

In practice, the optical flow contains float values, not only integers. A warping function can be based on a bilinear interpolation (e.g., between 4 values), which is differentiable, except in the exceptional case where the flow values are integers, in which case the gradient is set to zero.

A generic warped recurrent neural network module, nicknamed "FlowingRNN," can thus be written as a recurrent neural network module in which the internal state is warped between frames according to the optical flow, i.e.:

$$o_t, h_t = \text{FlowingRNN}(x_t, \vec{h}_{t-1})$$

In a preferred embodiment, a "FlowingGRU;" i.e., a FlowingRNN based on the convolutional gated recurrent unit module is used. The following formula can thus be given:

$$z_t = \sigma(W_{hz} * \vec{h}_{t-1} + W_{xz} * x_t + b_z)$$

$$r_t = \sigma(W_{hr} * \vec{h}_{t-1} + W_{xr} * x_t + b_r)$$

$$n_t = \text{ReLU}(W_{hn} * (r_t \odot \vec{h}_{t-1}) + W_{xn} * x_t + b_n)$$

$$h_t = (1-z_t) \odot \vec{h}_{t-1} + z_t \odot n_t$$

Where ⊙ is the element-wise multiplication, * the convolution operator, σ the sigmoid function, ReLU the rectified linear unit non-linearity (see below), and W's and b's are learnable parameters (weights and biases, respectively).

Intuitively, the reset gate $r_t$ is learning how to combine the input $x_t$ with the previous hidden state $h_{t-1}$, while the update gate $z_t$ is learning how much of the previous memory should be kept.

The main difference between the present FlowingGRU and the standard convolutional gated recurrent unit is that the hidden state is warped according to the optical flow, and thus the prediction at a given pixel and time step is based on the history of this particular point in the real world, even in the case of pixel motion. One minor difference is also that a ReLU non-linearity is preferably used instead of a standard tanh as ReLU is more common in computer vision convolutional neural network architectures.

The skilled person will be able to transpose the described architecture to any other type of recurrent module. In particular, instead of a "FlowingGRU," a "FlowingLSTM"; i.e., a FlowingRNN based on the convolutional long short-term memory module; can be used.

Generally speaking, FlowingRNN can be plugged into any fully convolutional image segmentation approach so as to perform an enhanced semantic segmentation of videos, with increased performance, especially in term of consistency across time.

Figure 1:
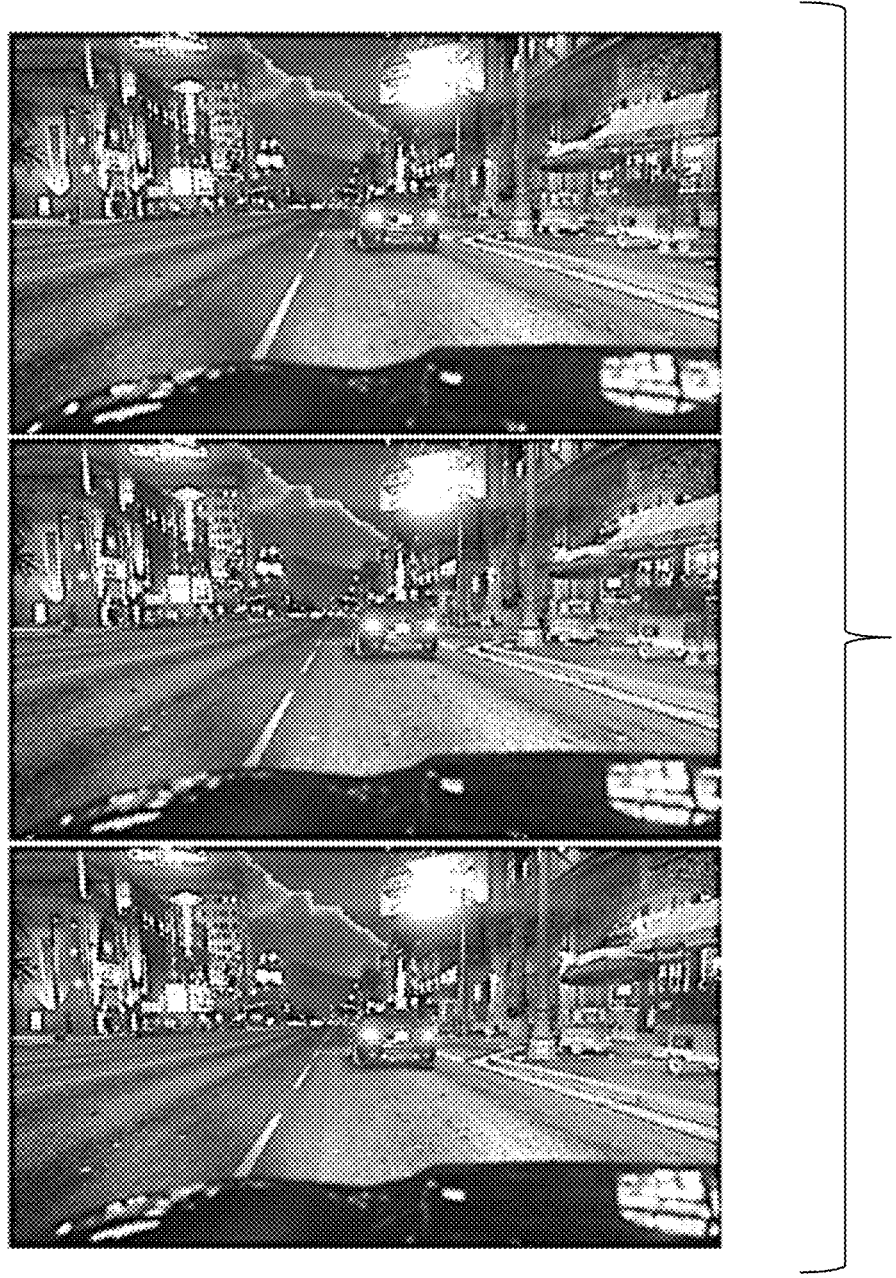
FIG. 1 represents an example of three successive frames.
Figure 2:
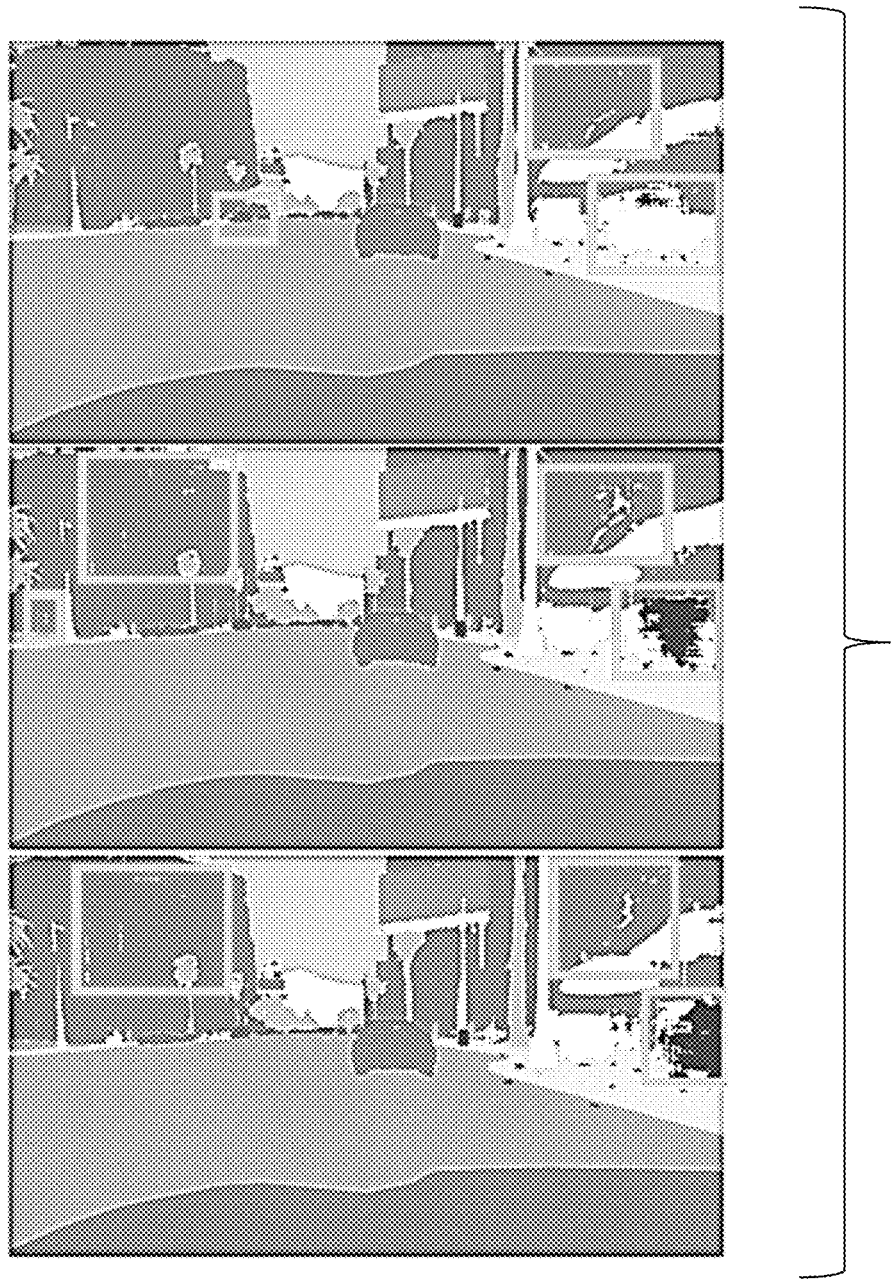
FIG. 2 represents semantic segmentation of the example frames of FIG. 1 using a conventional per-frame technique.
Figure 3:
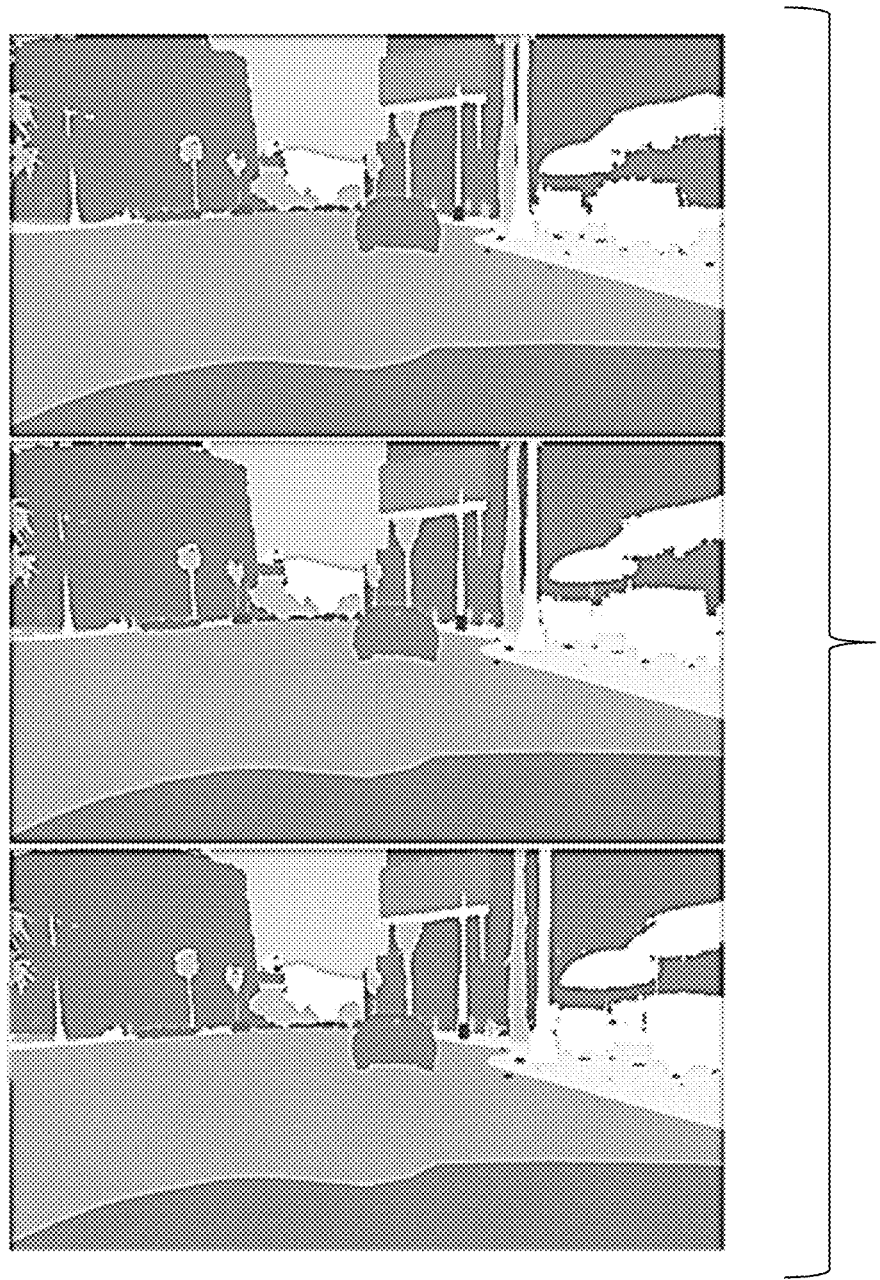
FIG. 3 represents semantic segmentation of the example frames of FIG. 1 using the convolutional recurrent neural network architecture of FIG. 7.

FIG. 3 shows examples of semantic segmentation using FlowingRNN on the three consecutive frames of FIG. 1. With respect to FIG. 2, an absence of noise artifacts in the predicted labels across time (boxes) can be observed in FIG. 3.

The convolutional recurrent neural network, the flow estimation, and the warping modules are all differentiable, making it possible to train the full network end-to-end.

In a first aspect, a training method is implemented by the data processing means 11a of the first server 1a. The method trains the convolutional recurrent neural network for semantic segmentation in videos.

In a first step (a), a standard convolutional neural network, (not recurrent), which will be referred to as "first convolutional neural network," is trained from a base of training images already semantically segmented (for example the MS-Coco dataset).

In other words, the first convolutional neural network is a classic "per-frame" baseline which does not take into account local dependency across time. Any known architecture can be used for the first convolutional neural network.

Convolutional neural networks generally contain four types of layers processing the information:
(a) the convolution layer which processes blocks of the image one after the other;
(b) the non-linear layer (also called correction layer) which allows pertinence of the result to be improved by applying an "activation function";
(c) the pooling layer which allows the grouping together of several neurons in one single neuron; and
(d) the fully connected layer that connects all the neurons of a layer with all the neurons of the preceding layer.

It will be here noted that in case of a fully convolutional network, the fully connected layer(s) do(es) not exist anymore and are(is) transformed into a convolutional layer of kernel size 1. This allows an output map of probabilities instead of just one probability distribution for the entire image.

The activation function of the non-linear layer, the most frequently used is the ReLU function (Rectified Linear Unit), which is equal to f(x)=max(0, x), and the pooling layer (POOL), the most used is the MaxPool2×2 function, which corresponds to a maximum between four values of a square (four values are pooled into one), but other pooling functions; such as AveragePool or Sum Pool; can be used.

The convolution layer (CONV) and the fully connected layer (FC), generally correspond to a scalar product between the neurons of the preceding layer and the weights of the convolutional neural network.

Typical convolutional neural network architectures stack a few pairs of layers CONV→RELU then add a layer POOL and repeat this scheme [(CONV→RELU)p→POOL] until a sufficiently small output vector is obtained, and terminate with one or two fully connected layers.

Figure 6:
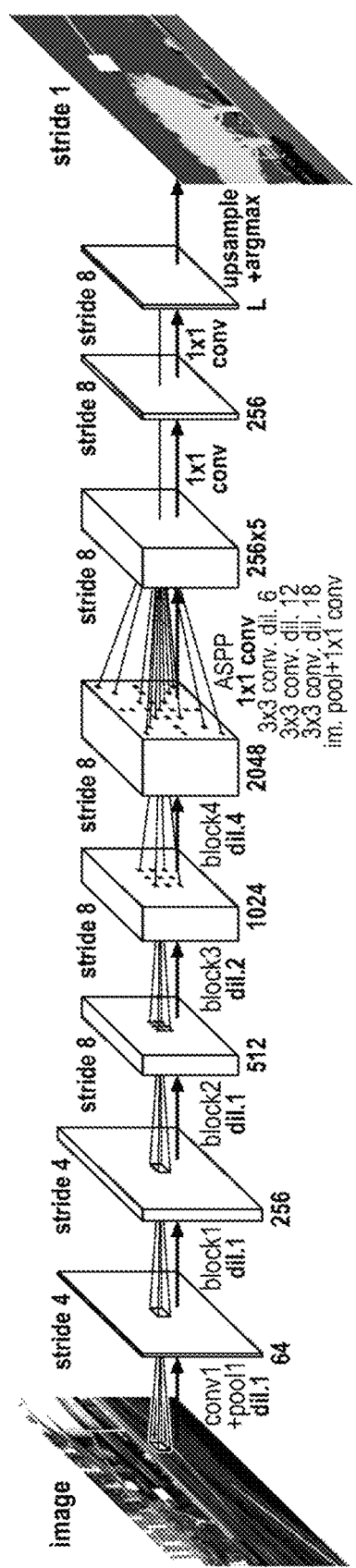
FIG. 6 represents an example of a convolutional neural network architecture for use in semantic segmentation.

In the example of FIG. 6, an architecture for the first convolutional neural network is illustrated.

As illustrated in FIG. 6, the first convolution layer as well as block1 to block4 are from ResNet-101, except that block3 and block4 are using dilated convolutions with a factor (also called rate) of 2 and 4, respectively, reducing the stride of the network from 32 to 8.

Next is an atrous spatial pyramid pooling (ASPP) module in which the results from different convolutional kernels with various dilation factors are stacked. The output of the atrous spatial pyramid pooling module is fed to a 1×1 convolution layer (with batch normalization and ReLU) with 256 filters, before a final 1×1 convolution layer that outputs class scores. These scores are bilinearly upsampled to the initial image resolution, to apply for example the per-pixel softmax loss at training time, or to estimate the predicted class by taking the per-pixel argmax at test time.

To train the first convolutional neural network, a stochastic gradient descent (SGD) with a batch size of 16 can be used. In particular, a so-called 'poly' learning rate schedule; i.e., the initial learning rate is multiplied by $$\left(1-\frac{i}{N}\right)^{0.9}$$

at the iteration i over a total number of N iterations; could be employed.

Training patches come from random crops of the training images with size for example of 321×321 pixels, while the convolutional neural network can be tested on the full images. At training, data augmentation is preferably performed by randomly left-right flipping the images, and applying a random scaling factor in the range [0:5; 1:5], before taking the random crop.

Additionally (step (a)), a further training of a second convolutional neural network from a base of training pairs of successive frames between which the optical flow is known is carried out.

As it will be explained, the second convolutional neural network aims at estimating the optical flow in pairs of frames, in particular a backward optical flow $F_{t\rightarrow t-1}$ from a current frame t to the previous frame t−1.

The second convolutional neural network may be such as FlowNetSimple or FlowNetCorrelation. The architecture FlowNetSimple (generally just called FlowNetS) is preferred and used in the example of FIG. 6. In this architecture, both input images are stacked together and fed through a network only made of convolutional layers.

ReLU non-linearity and 'cupconvolution' can also be implemented as convolutions.

Thereafter (step (b)), the convolutional recurrent neural network is trained. The idea is to build the convolutional recurrent neural network from the first convolutional neural network (and the second convolutional neural network if there is one).

The convolutional recurrent neural network corresponds to the first convolutional neural network wherein a convolutional layer has been replaced by a recurrent module having a hidden state as explained above (a FlowingRNN module such as FlowingGRU).

Preferably, as represented by FIG. 6, the convolutional layer of the first convolutional neural network, which is replaced by a recurrent module, is the penultimate convolutional layer. This position offers excellent results as it is just after the atrous spatial pyramid pooling module in the example based on ResNet-101, but the recurrent module may be placed elsewhere in the first convolutional neural network, for instance replace the last convolutional layer. Also, there could be three convolutional layers after the atrous spatial pyramid pooling module, and the recurrent module could replace the first one (i.e., be the antepenultimate convolutional layer of the first convolutional neural network).

The training of the first convolutional neural network (step (a)) could be seen as an "initialization" of the parameters of the convolutional recurrent neural network, and the training of the convolutional recurrent neural network (step (b)) could be seen as a "fine-tuning" of these parameters by a further training from a base of training videos already semantically segmented (as explained below).

Some of parameters obtained thanks to the training of the first convolutional neural network can be fixed, i.e., not further learned in the training of convolutional recurrent neural network, preferably the parameters of each layer of the convolutional recurrent neural network before the recurrent module (i.e., until the atrous spatial pyramid pooling is included). The parameters further learned are then preferably those of the recurrent module, the last convolutional layer of the convolutional neural network (and generally each convolutional layer not fixed), and possibly the second convolutional neural network (if there is one).

Most popular benchmarks for semantic segmentation are limited to images and cannot be used in the training of convolutional recurrent neural network. While the present method can be trained even if only a few pixels are annotated in the videos, by ignoring pixels that are not annotated in the loss, training with dense ground-truth would likely lead to better temporal consistency.

Most real-world datasets have only one frame annotated per sequence, while some synthetic benchmarks are limited by the realism of the data or by the low number of sequences, so that the base of training videos already semantically segmented is preferably the recent Viper dataset, which consists of around 250k frames from almost 200 video sequences captured from the realistic Grand Theft Auto V video game.

The synthetic rendering allows one to obtain ground-truth for multiple tasks, including semantic segmentation. Illumination and weather conditions vary from day to night, from sunny to rainy, snowy or foggy, making the dataset challenging. The semantic segmentation task has 23 classes including stuff (e.g., sky, terrain), vehicles (e.g., car, truck), and small objects (e.g., traffic sign, traffic light).

The training of the convolutional recurrent neural network (step (b)) advantageously starts with estimating (sub-step (b0)), for each pair of successive frames t−1, t∈〚1; T〛² of a video of the base of training videos already semantically segmented, the optical flow between the frames of the pair (in particular the backward optical flow $F_{t \to t-1}$ from the current frame t to the previous frame t−1).

This step (step (b)) in training is preferably performed using the second the training of the convolutional neural network (FlowNetS in the FIG. 6) using as input the both frames of the pair, but the present method is not limited to any technique for estimating the optical flow.

It is to be noted that the optical flow could be already estimated between frames of the training base so this step in training (sub-step (b0)) stays optional.

Additionally (sub-step (b1)), as already explained, the internal state of the recurrent layer is warped according to the estimated optical flow, so as to adapt the internal state to the motion of pixels between the frames of the pair.

Thereafter (sub-step (b2)), parameters of at least the recurrent module are learned.

In addition to the recurrent module, since the output of this layer will be different from the one of the per-frame baseline, the following layers are also re-learned. As already explained, the parameters further learned are then preferably those of the recurrent module, the last convolutional layer of the convolutional neural network (and generally each convolutional layer not fixed), and possibly the second convolutional neural network (if there is one).

To this end, stochastic gradient descent, using backpropagation though time algorithm with a poly learning rate schedule similar as for the initial training of the first CNN, with a batch size of 4 and training sequences of 12 consecutive frames, can be used. Similar data augmentation strategy can be also used. At test time, the hidden state from the previous frame can be used, without limitation on the sequence length.

In a second aspect, there is proposed an inputted video semantic segmentation method implemented by the data processing means 11b of the second server 1b. In other words, the method according to the second aspect performs the semantic segmentation of an inputted video, i.e., labels pixels of the frames of the inputted video.

The inputted video to be segmented can be received from the client equipment 10.

Figure 7:
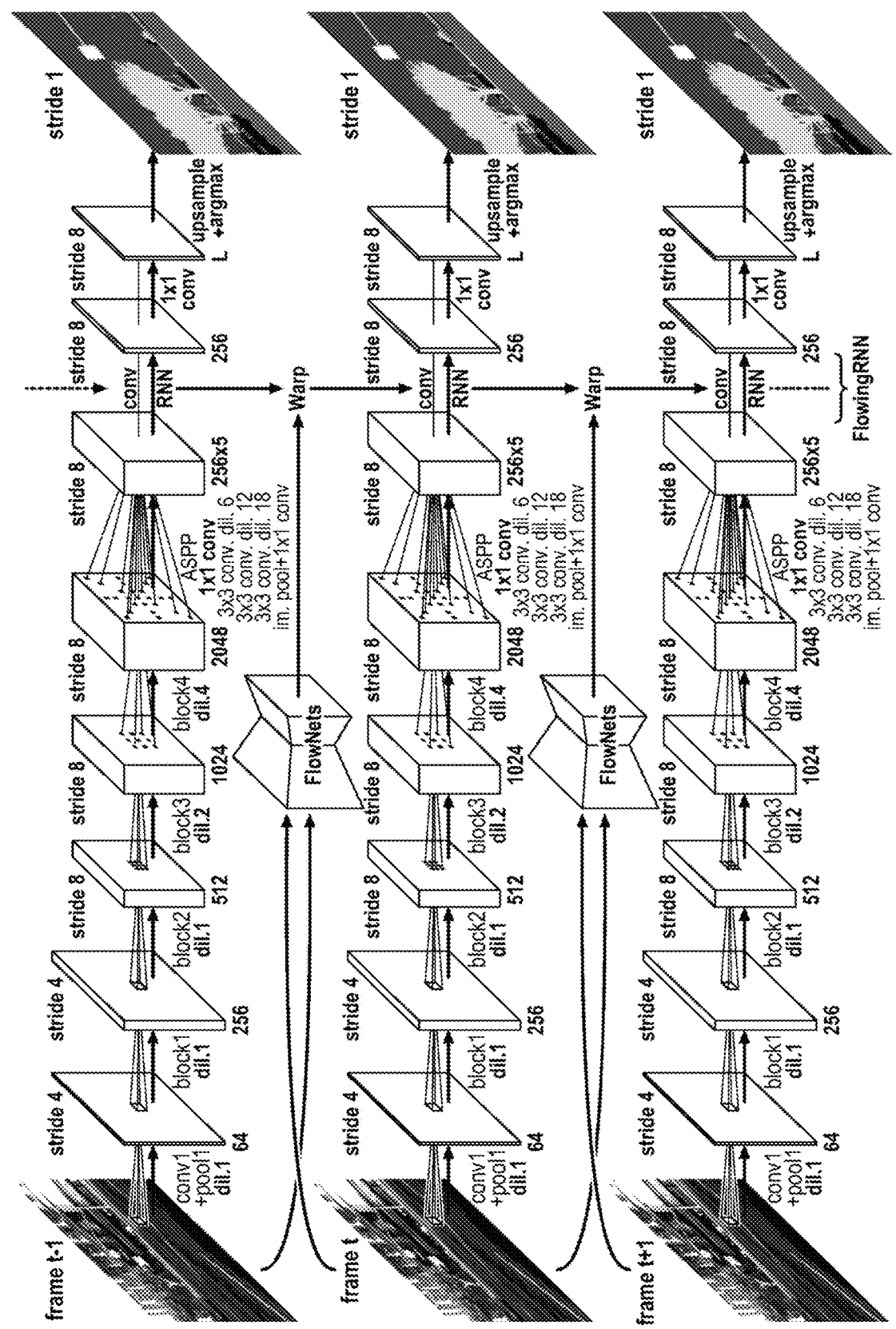
FIG. 7 represents an example of a convolutional recurrent neural network architecture for use in semantic segmentation.

At a first step (a), the training of a convolutional recurrent neural network, as illustrated in FIG. 7, is performed by the first server 1a (from at least a base of training videos already semantically segmented, and advantageously a base of training images already semantically segmented). Preferably, the training is consistent with the method according to the first aspect; i.e., a first convolutional neural network is trained, so that is constructed a convolutional recurrent neural network based on the first convolutional neural network wherein the penultimate convolutional layer is replaced by a recurrent module of the "FlowingRNN" type.

Alternatively, or in combination, the step (a') may further comprise training from a base of training pairs of successive frames between which the optical flow is known, a convolutional neural network, (i.e., the second convolutional neural network of the training method).

It is to be understood that either the first and the second server 1a, 1b are the same equipment, or step (a') comprise the transmission of the trained convolutional recurrent neural network parameters and weights from the first server 1a to the second server 1b, for storage in the memory 12.

At a second step (b'), the processing means 11b of the second server 1b uses the convolutional recurrent neural network for the segmentation.

To this end, step (b') comprises, for each pair of successive frames (t−1, t∈〚1; T〛²) of the inputted video:

(b'0) estimating the optical flow between the frames of the pair;

(b'1) warping the internal state of the recurrent layer according to the estimated optical flow, so as to adapt the internal state to the motion of pixels between the frames of the pair; and (b'2) semantically segmenting each frame with the convolutional recurrent neural network.

The sub-steps (b'0) and (b'1) are advantageously equivalent to sub-steps (b0) and (b1), as described above, and can include any refinement thereof.

Finally, the classification result obtained can be transmitted back to the client equipment 10.

The efficiency of the present method could be evaluated using the standard per-pixel mean Intersection-over-Union metric (mIoU$^P$): for each class, the ratio of the number of pixels correctly predicted for this class over the number of pixels whose ground-truth or prediction in this class is computed, and the average over all classes is reported.

However, this does not measure the temporal consistency of the semantic segmentation prediction. To this end, a mean Intersection-over-Union may be further computed at the trajectory level, in which a trajectory has to be consistently labeled across all frames with the ground-truth class in order to be considered as correct dense trajectories over the full videos can be extracted with optical flow extracted at half resolution and a density of 8 pixels.

Only the trajectories for which the ground-truth labeling is consistent are kept in order to filter out noisy trajectories due to the errors in the flow estimation. In practice, this filtering stage removes about 8% of the extracted trajectories.

It allows reporting the "per-trajectory" mean Intersection over Union (mIoU$^T$), in which trajectories whose pixels have different estimated labels are counted as wrong. The consistency in each class could also be computed as the following: among the trajectories whose ground-truth is consistently a given class, is computed the ratio of trajectories for which the prediction is consistent, whatever the predicted class. The "mean consistency" (mCons.) could be reported by averaging over all classes.

Firstly, the impact of the length T of the training sequences on the performance of the preferred FlowingGRU module is studied. At test time, the hidden state of the previous frame is used in all cases, independently of the length of the sequences used at training. As a sanity check, the model is firstly used with an all-zeroes internal state in all cases and sequences of 1 frame at training, so as to validate that the performance is similar to the per-frame baseline. T is then increased from 2 to 12. A consistent gain in performance is observed when T increases. The $mIoU^P$ is higher by 1.2%, the $mIoU^T$ by 2.1% and the mCons by 3.5% when using training sequences of 12 frames compared to the per-frame baseline.

Then, the impact of the number of output channels C of the convolutions (and thus of the internal state also) in the preferred FlowingGRU module is studied, as well as the kernel size K (of all convolutions in FlowingGRU). It is noted that optimal performances are observed with C=256 and K=3, which can be explained by the facts that:

a lower number of channels does not suffice to carry relevant information, both spatially from the previous layer and over time from the previous frames for an accurate semantic segmentation;

a kernel with a size higher than 1 allows to integrate information over a local neighborhood, and thus to recover from small errors in the optical flow computation; and a kernel with a size higher than 3 has too many parameters to effectively learn local temporal consistency.

The impact of the FlowingGRU module (with the preferred values T=12, K=3 and C=256) is compared to some variants and to related works in Table 1 (left). Note that neither of these works has been tested with the Viper dataset and the works use different backbone architectures. For a fair comparison, the same baseline is used, their respective proposed modules are plugged at the same place as FlowingRNN, and the same training scheme is followed.

TABLE 1

|  | Viper | | | Cityscapes |
| --- | --- | --- | --- | --- |
|  | $mIoU^P$ | $mIoU^T$ | mCons. | $mIoU^P$ |
| per-frame | 69.78 | 71.19 | 82.68 | 73.17 |
| FlowingGRU | 71.00 | 73.33 | 86.12 | 74.31 |
| FlowingGRU (tanh) | 70.18 | 71.68 | 83.64 | 73.11 |
| FlowingGRU (fixed flow) | 70.13 | 71.57 | 83.95 | 71.14 |
| ConvGRU | 70.24 | 71.70 | 83.57 | 70.70 |
| ConvLSTM | 65.62 | 68.64 | 81.10 | 71.77 |
| FlowingLSTM | 69.68 | 70.42 | 82.42 | 72.87 |
| ConvGRU last | 69.96 | 71.99 | 83.82 | 72.96 |
| FlowingGRU last | 70.40 | 72.90 | 85.84 | 74.02 |

The FlowingGRU module (with ReLU non-linearity) compared to the per-frame baseline shows a clear improvement of 1.22% in $mIoU^P$, 2.14% in $mIoU^T$ and 3.44% in mCons. This highlights that FlowingGRU effectively leverages temporal information for dense video prediction tasks while taking into account pixel motion.

The FlowingGRU module with ReLU non-linearity could be compared to two variants. The first one consists in using a standard tanh nonlinearity in the equation page 13 (instead of ReLU), see row 'FlowingGRU (tanh)' in Table 1. A drop of 0.8% in $mIoU^P$ is observed, showing that ReLU is more suitable for semantic segmentation.

In the second variant the parameters of FlowNetS are fixed, and not finetuned during training (i.e., the second convolutional neural network is not further learned in step (b)), see row 'FlowingGRU (fixed flow)' in Table 1. In this case, the decrease is of 0.9% in $mIoU^P$, showing the importance of training the flow estimation together with the FlowingGRU module.

The FlowingGRU module is further compared to other recurrent models. A standard convolutional gated recurrent unit (ConvGRU) is firstly tried, without warping of the internal state, as used for instance in the context of semantic video segmentation. Results are reported in row 'ConvGRU' of Table 1. The three metrics are slightly increased compared to the per-frame baseline, showing that it indeed learns some temporal consistency. However, ConvGRU performs significantly worse than the preferred FlowingGRU, with for instance a $mIoU^P$ 0.8% lower. Indeed, by keeping the internal state as it is between consecutive frames, ConvGRU assumes that the pixels at the same location in consecutive frames are projections of the same real-world point, which is wrong in most cases. Similarly, the $mIoU^T$ and the mCons also significantly decrease by 1.63% and 2.55% respectively.

Next, the gated recurrent unit is replaced by long short-term memory in which a ReLU non-linearity is also used instead of tanh, see rows 'ConvLSTM' and 'FlowingLSTM' in Table 1. The performance is significantly lower than with gated recurrent unit. One explanation is that long short-term memories are harder to train than gated recurrent units for vision tasks. One interesting result in that FlowingLSTM performs significantly better than the Convolutional LSTM (+4.06% in $mIoU^P$), highlighting again the importance of warping the internal state.

Finally, the position of the FlowingGRU module could be studied by replacing the last convolutional layer instead of the penultimate one. In this case, note that the output goes into a softmax (no non linearity could be used). It is noted that this variant leads to a decrease of 0.6% $mIoU^P$ on the Viper dataset. When using ConvGRU, the performance is also lower when placing the module at the last layer. By replacing the penultimate layer, the history is embedded in a latent space from which the final prediction is made, which is more powerful than directly predicting the final segmentation from the hidden state and the current features.

Several experiments could also be run on the real-world Cityscapes dataset using the fine annotation only, i.e., 2975 sequences for training and 500 for validation. Each sequence has 30 frames with annotation on 1 frame only (the twentieth frame).

The training and testing procedures can be kept similar to the case of the Viper dataset. The only difference is that ground-truth is annotated on sparse frames. Therefore, during training, the loss for frames that are not annotated is ignored, making video information less suitable to be leveraged. The noisy trajectories cannot be cleaned with only one annotated frame per sequence, so that only $mIoU^P$ may be reported.

Results for different variants are reported in the right column of Table 1. First, it can be observed that FlowingGRU outperforms the per-frame baseline with a gain of 1.14% in $mIoU^P$. In all cases, the 'Flowing' counterpart performs significantly better than the static convolutional module.

In summary, a method for training a convolutional recurrent neural network for semantic segmentation in videos includes training from a base of training images already semantically segmented, a first convolutional neural network; training from a base of training videos already semantically segmented, a convolutional recurrent neural network, corresponding to the first convolutional neural network wherein a convolutional layer has been replaced by a recurrent module having a hidden state. The training includes, for each pair of successive frames of a video of the base of training videos already semantically segmented, warping the internal state of the recurrent layer according to an estimated optical flow between the frames of the pair, so as to adapt the internal state to the motion of pixels between the frames of the pair and learning parameters of at least the recurrent module.

Advantageously, providing a standard convolutional recurrent layer in which the internal state is warped between frames according to the optical flow (which can be estimated using another convolutional neural network) improves semantic segmentation in videos, especially in term of consistency across time.

The pair of successive frames, preferably, comprises a previous frame and a current frame, the optical flow estimated being the backward optical flow from the current frame to the previous frame, and the warping function to the internal state associated with the previous frame so as to obtain a warped internal state associated to the previous frame corresponding to the internal state wherein each pixel has underwent a displacement according to the backward optical flow;

The warping function is such that $\forall p_t, \vec{h}_{t-1}(p_t) = h_{t-1}(p_t + F_{t \to t-1}(p_t))$, wherein $p_t$ is a pixel of the current frame t, $F_{t \to t-1}$ is the backward optical flow, $h_{t-1}$ is the internal state associated to the previous frame t−1, $\vec{h}_{t-1}$ is the warped internal state associated to the previous frame t−1;

The estimating of the optical flow between the frames of the pair, may be performed using a second convolutional neural network, by training from a base of training pairs of successive frames between which the optical flow is known, the second convolutional neural network. The second convolutional neural network may be a FlowNetSimple network or a FlowNetCorrelation network;

The parameters of each layer of the convolutional recurrent neural network before the recurrent module may be fixed.

The convolutional layer of the first convolutional neural network, which is replaced by a recurrent module, may be the penultimate convolutional layer.

The learned parameters of the convolutional recurrent neural network may be those of the recurrent module and the last convolutional layer of the first convolutional neural network.

The first convolutional neural network may include, before the penultimate convolutional layer, an atrous spatial pyramid pooling module.

The recurrent module may include a convolutional gated recurrent unit or a convolutional long short-term memory.

A method for semantic segmentation of an inputted video, using a convolutional recurrent neural network trained by training, using a set of semantically segmented training images, a first convolutional neural network; training, using a set of semantically segmented training videos, a convolutional recurrent neural network, corresponding to the first convolutional neural network, wherein a convolutional layer has been replaced by a recurrent module having a hidden state; the training of the convolutional recurrent neural network, for each pair of successive frames (t−1, t∈[[1; T]]²) of a video of the set of semantically segmented training videos including warping an internal state of a recurrent layer according to an estimated optical flow between the frames of the pair of successive frames, so as to adapt the internal state to the motion of pixels between the frames of the pair and learning parameters of at least the recurrent module, includes (a) estimating, for each pair of successive frames (t−1, t∈[[1; T]]²) of the inputted video, the optical flow between the frames of the pair; (b) warping, for each pair of successive frames (t−1, t∈[[1; T]]²) of the inputted video, the internal state of the recurrent layer according to the estimated optical flow, so as to adapt the internal state to the motion of pixels between the frames of the pair; and (c) semantically segmenting, for each pair of successive frames (t−1, t∈[[1; T]]²) of the inputted video, each frame with the convolutional recurrent neural network.

The training of the convolutional recurrent neural network may include training, using a set of training pairs of successive frames between which the optical flow is known, a second convolutional neural network, wherein said (a) is performed using the second convolutional neural network.

The second convolutional neural network may be a FlowNetSimple network or a FlowNetCorrelation network.

A method for semantic segmentation of an inputted video, using a convolutional recurrent neural network, includes (a) estimating, for each pair of successive frames (t−1, t∈[[1; T]]²) of the inputted video, the optical flow between the frames of the pair; (b) warping, for each pair of successive frames (t−1, t∈[[1; T]]²) of the inputted video, the internal state of the recurrent layer according to the estimated optical flow, so as to adapt the internal state to the motion of pixels between the frames of the pair; and (c) semantically segmenting, for each pair of successive frames (t−1, t∈[[1; T]]²) of the inputted video, each frame with the convolutional recurrent neural network, wherein the convolution recurrent network is trained by training, using a set of semantically segmented training images, a first convolutional neural network; training, using a set of semantically segmented training videos, a convolutional recurrent neural network, corresponding to the first convolutional neural network, wherein a convolutional layer has been replaced by a recurrent module having a hidden state; the training of the convolutional recurrent neural network, for each pair of successive frames (t−1, t∈[[1; T]]²) of a video of the set of semantically segmented training videos including warping an internal state of a recurrent layer according to an estimated optical flow between the frames of the pair of successive frames, so as to adapt the internal state to the motion of pixels between the frames of the pair and learning parameters of at least the recurrent module.

The training of the convolutional recurrent neural network may include training, using a set of training pairs of successive frames between which the optical flow is known, a second convolutional neural network, wherein said (a) is performed using the second convolutional neural network.

The second convolutional neural network may be a FlowNetSimple network or a FlowNetCorrelation network.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A method for training a convolutional recurrent neural network for semantic segmentation in videos, comprising:
   (a) training, using a set of semantically segmented training images, a first convolutional neural network;

(b) training, using a set of semantically segmented training videos, a convolutional recurrent neural network, corresponding to the first convolutional neural network, wherein a convolutional layer has been replaced by a recurrent module having a hidden state;

said training of the convolutional recurrent neural network, for each pair of successive frames (t−1, t∈ [[1; T]]$^2$) of a video of the set of semantically segmented training videos, each pair of successive frames (t−1, t∈ [[1; T]]$^2$) including a previous frame (t−1) and a current frame (t), including, (b1) warping an internal state of a recurrent layer, according to an estimated optical flow between the frames of the pair of successive frames, so as to adapt the internal state to the motion of pixels between the frames of the pair, the estimated optical flow being a backward optical flow ($F_{t \to t-1}$) from the current frame (t) to the previous frame (t−1), and (b2) learning parameters of at least the recurrent module.

2. The method according to claim 1, wherein said (b1) applying a warping function to the internal state ($h_{t-1}$) associated with the previous frame (t−1) so as to obtain a warped internal state ($\vec{h}_{t-1}$) associated with the previous frame (t−1) corresponding to the internal state ($h_{t-1}$) wherein each pixel has underwent a displacement according to the backward optical flow ($F_{t \to t-1}$).

3. The method according to claim 2, wherein the warping function is $\forall p_\tau, \vec{h}_{t-1}(p_t) = h_{t-1}(p_t + F_{t \to t-1}(p_t))$, wherein $p_t$ is a pixel of the current frame t, $F_{t \to z-1}$ is the backward optical flow, $h_{z-1}$ is the internal state associated with the previous frame t−1, $\vec{h}_{t-1}$ is the warped internal state associated with the previous frame t−1.

4. The method according to claim 1, wherein said (b1) comprises estimating an optical flow between the frames of the pair of successive frames, performed using a second convolutional neural network, wherein the second convolutional neural network is trained using a set of training pairs of successive frames between which the optical flow is known.

5. The method according to claim 4, wherein the second convolutional neural network is a FlowNetSimple network.

6. The method according to claim 4, wherein the second convolutional neural network is a FlowNetCorrelation network.

7. The method according to claim 1, wherein the parameters of each layer of the convolutional recurrent neural network before the recurrent module are fixed during said (b2).

8. The method according to claim 1, wherein the convolutional layer of the first convolutional neural network which is replaced by a recurrent module is the penultimate convolutional layer.

9. The method according to claim 7, wherein the parameters of the convolutional recurrent neural network learned at said (b2) are those of the recurrent module and the last convolutional layer of the first convolutional neural network.

10. The method according to claim 4, wherein said (b2) comprises further learning the parameters of the second convolutional neural network.

11. The method according to claim 7, wherein the first convolutional neural network comprises, before the penultimate convolutional layer, an atrous spatial pyramid pooling module.

12. The method according to claim 1, wherein the recurrent module includes a convolutional gated recurrent unit.

13. The method according to claim 1, wherein the recurrent module includes a convolutional long short-term memory.

14. A method for semantic segmentation of an inputted video, using a convolutional recurrent neural network trained by training, using a set of semantically segmented training images, a first convolutional neural network; training, using a set of semantically segmented training videos, a convolutional recurrent neural network, corresponding to the first convolutional neural network, wherein a convolutional layer has been replaced by a recurrent module having a hidden state; the training of the convolutional recurrent neural network, for each pair of successive frames (t−1, t∈ [[1; T]]$^2$) of a video of the set of semantically segmented training videos including warping an internal state of a recurrent layer according to an estimated optical flow between the frames of the pair of successive frames, so as to adapt the internal state to the motion of pixels between the frames of the pair and learning parameters of at least the recurrent module, comprising:

(a) estimating, for each pair of successive frames (t−1, t∈ [[1; T]]$^2$) of the inputted video, the optical flow between the frames of the pair, each pair of successive frames (t−1, t∈[[1; T]]$^2$) including a previous frame (t−1) and a current frame (t), the estimated optical flow being a backward optical flow ($F_{t \to t-1}$) from the current frame (t) to the previous frame (t−1);

(b) warping, for each pair of successive frames (t−1, t∈ [[1; T]]$^2$) of the inputted video, the internal state of the recurrent layer according to the estimated optical flow, so as to adapt the internal state to the motion of pixels between the frames of the pair; and (c) semantically segmenting, for each pair of successive frames (t−1, t∈[[1; T]]$^2$) of the inputted video, each frame with the convolutional recurrent neural network.

15. The method according to claim 14, wherein the training of the convolutional recurrent neural network includes training, using a set of training pairs of successive frames between which the optical flow is known, a second convolutional neural network, wherein said (a) is performed using the second convolutional neural network.

16. The method according to claim 15, wherein the second convolutional neural network is a FlowNetSimple network.

17. The method according to claim 15, wherein the second convolutional neural network is a FlowNetCorrelation network.

18. A method for semantic segmentation of an inputted video, using a convolutional recurrent neural network, comprising:

(a) estimating, for each pair of successive frames (t−1, t∈ [[1; T]]$^2$) of the inputted video, the optical flow between the frames of the pair, each pair of successive frames (t−1, t∈[[1; T]]$^2$) including a previous frame (t−1) and a current frame (t), the estimated optical flow being a backward optical flow ($F_{t \to t-1}$) from the current frame (t) to the previous frame (t−1);

(b) warping, for each pair of successive frames (t−1, t∈ [[T]]$^2$) of the inputted video, the internal state of the recurrent layer according to the estimated optical flow, so as to adapt the internal state to the motion of pixels between the frames of the pair; and (c) semantically segmenting, for each pair of successive frames (t−1, t∈[[1; T]]$^2$) of the inputted video, each frame with the convolutional recurrent neural network, wherein the convolution recurrent network is trained by
training, using a set of semantically segmented training
images, a first convolutional neural network; training,
using a set of semantically segmented training videos,
a convolutional recurrent neural network, corresponding to the first convolutional neural network, wherein a
convolutional layer has been replaced by a recurrent
module having a hidden state; the training of the
convolutional recurrent neural network, for each pair of
successive frames $(t-1, t \in [\![ 1; T ]\!]^2)$ of a video of the set
of semantically segmented training videos including
warping an internal state of a recurrent layer according
to an estimated optical flow between the frames of the
pair of successive frames, so as to adapt the internal
state to the motion of pixels between the frames of the
pair and learning parameters of at least the recurrent
module.

19. The method according to claim 18, wherein the training of the convolutional recurrent neural network includes training, using a set of training pairs of successive frames between which the optical flow is known, a second convolutional neural network, wherein said (a) is performed using the second convolutional neural network.

20. The method according to claim 19, wherein the second convolutional neural network is a FlowNetSimple network.

21. The method according to claim 19, wherein the second convolutional neural network is a FlowNetCorrelation network.

* * * * *